United States Patent
Mau et al.

(10) Patent No.: US 7,193,203 B1
(45) Date of Patent: Mar. 20, 2007

(54) METHOD AND DEVICE FOR TRACKING MOVEMENT BETWEEN A SURFACE AND AN IMAGER

(75) Inventors: Ming Yong Mau, Penang (MY); Lye Hock Bernard Chan, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/285,848

(22) Filed: Nov. 22, 2005

(51) Int. Cl.
*G06M 7/00* (2006.01)
*G09G 5/08* (2006.01)

(52) U.S. Cl. ............ 250/221; 345/166; 382/107
(58) Field of Classification Search ........... 250/221; 345/163, 166; 382/107, 270–273, 313
See application file for complete search history.

(56) References Cited

U.S. PATENT DOCUMENTS

2004/0160411 A1* 8/2004 Yang .................. 345/156
2005/0012022 A1* 1/2005 Lin .................... 250/205

* cited by examiner

*Primary Examiner*—Thanh X. Luu

(57) ABSTRACT

In one embodiment, movement between a surface and an imager is tracked by using the imager to acquire a series of digital images of the surface. Each of the digital images represents a pattern of light that is reflected from the surface. If a first number of the digital images have surface qualities that are above a surface quality threshold set to an initial value, ones of the series of digital images are compared to track movement between the surface and the imager. If a second number of the digital images have surface qualities that are below the surface quality threshold, then i) the surface quality threshold is dynamically lowered to a new value, and thereafter ii) ones of the series of digital images are compared to track movement between the surface and the imager. Other embodiments are also disclosed.

24 Claims, 3 Drawing Sheets

METHOD AND DEVICE FOR TRACKING MOVEMENT BETWEEN A SURFACE AND AN IMAGER

BACKGROUND

Movement between a surface and an imager may be tracked by 1) using the imager to acquire a series of digital images of the surface, 2) comparing successive ones of the series of digital images, and 3) analyzing differences in the successive images to quantify movement between the surface and the imager. Depending on the algorithm(s) used to analyze the differences in the successive images, it may be possible to quantify direction, velocity and other characteristics of movement.

Typically, a device in which the afore-mentioned imager is mounted will also include a light source. The light source is used to illuminate the surface with a uniform light of known wavelength. In some cases, the light source may be a light-emitting diode (LED) or laser diode. The light source is mounted such that its light is ideally reflected from the surface to the imager. However, as a result of irregularities found in most surfaces (such as contour, color and composition irregularities), different portions of a surface will typically reflect light in different amounts, and at different angles. This, in turn, leads to different amounts of light being detected by different individual pixels of the imager. Movements between the surface and the imager then lead to movements in the overall pattern of light detected by the imager's pixels, which movements are used to track movement between the surface and the imager as described in the preceding paragraph.

One problem with the above-described method and device is that, even when there is no discernable movement between the surface and the imager, surface vibrations and/or imager or system noise (collectively referred to herein as "jitter") may lead to changes in the amount of light detected by the imager's various pixels. If suitable controls are not put in place, these changes (i.e., "jitter") may be reported as movement. One control for eliminating the interpretation of jitter as movement is a "surface quality threshold". Surface quality, or SQUAL, is the number of features that are found in a digital image captured by an imager. By setting a surface quality threshold, acquired images that have fewer features than the surface quality threshold can be discarded as "unusable" for tracking movement.

SUMMARY OF THE INVENTION

In one embodiment, a method of tracking movement between a surface and an imager comprises acquiring a series of digital images of the surface, via the imager. Each of the digital images represents a pattern of light that is reflected from the surface. If a first number of the digital images have surface qualities that are above a surface quality threshold when the surface quality threshold is set to an initial value, ones of the series of digital images are compared to track movement between the surface and the imager. If a second number of the digital images have surface qualities that are below the surface quality threshold when the surface quality threshold is set to the initial value, then i) the surface quality threshold is dynamically lowered to a new value, and thereafter ii) ones of the series of digital images are compared to track movement between the surface and the imager.

In another embodiment, a device for tracking movement comprises an imager to acquire a series of digital images of a surface, and a control system. Each of the digital images represents a pattern of light that is reflected from the surface. The control system is provided to 1) if a first number of the digital images have surface qualities that are above a surface quality threshold when the surface quality threshold is set to an initial value, compare ones of the series of digital images to track movement between the surface and the imager; and 2) if a second number of the digital images have surface qualities that are below the surface quality threshold when the surface quality threshold is set to the initial value then, i) dynamically lower the surface quality threshold to a new value, and thereafter ii) compare ones of the series of digital images to track movement between the surface and the imager.

Other embodiments are also disclosed.

BRIEF DESCRIPTION OF THE DRAWINGS

Illustrative embodiments of the invention are illustrated in the drawings, in which.

DETAILED DESCRIPTION

Movement between a surface and an imager may be tracked in various contexts. For example, movement may be tracked between parts of a machine, between a computer mouse and a surface, or between a handheld image scanner and a surface.

In cases where the type or quality of the surface can change, it is difficult to select an optimum surface quality threshold. For example, a computer mouse might be moved over a fabric or roughened plastic mouse pad, in which case the surface could be classified as "high contrast", and acquired images of the surface might contain enough features to overcome a relatively high surface quality threshold. However, the same computer mouse might also be moved over a smooth or glossy surface (e.g., a glass or painted enamel surface). In the case of a smooth or glossy surface, the surface could be classified as "low contrast", and acquired images of the surface might not contain enough features to overcome even a moderate surface quality threshold.

As the above example illustrates, for imagers that are used to detect movement with respect to changing surface types, tension exists as to whether the imager's surface quality threshold should be set high or low. A very low surface quality threshold, or none at all, would ensure that an imager could detect movement with respect to any surface. However, a very low surface quality threshold might also tend to interpret a lot of jitter as movement. On the other hand, a higher surface quality threshold might alleviate the jitter problem, but also prevent an imager from tracking movement with respect to low contrast surfaces.

Figure 1:
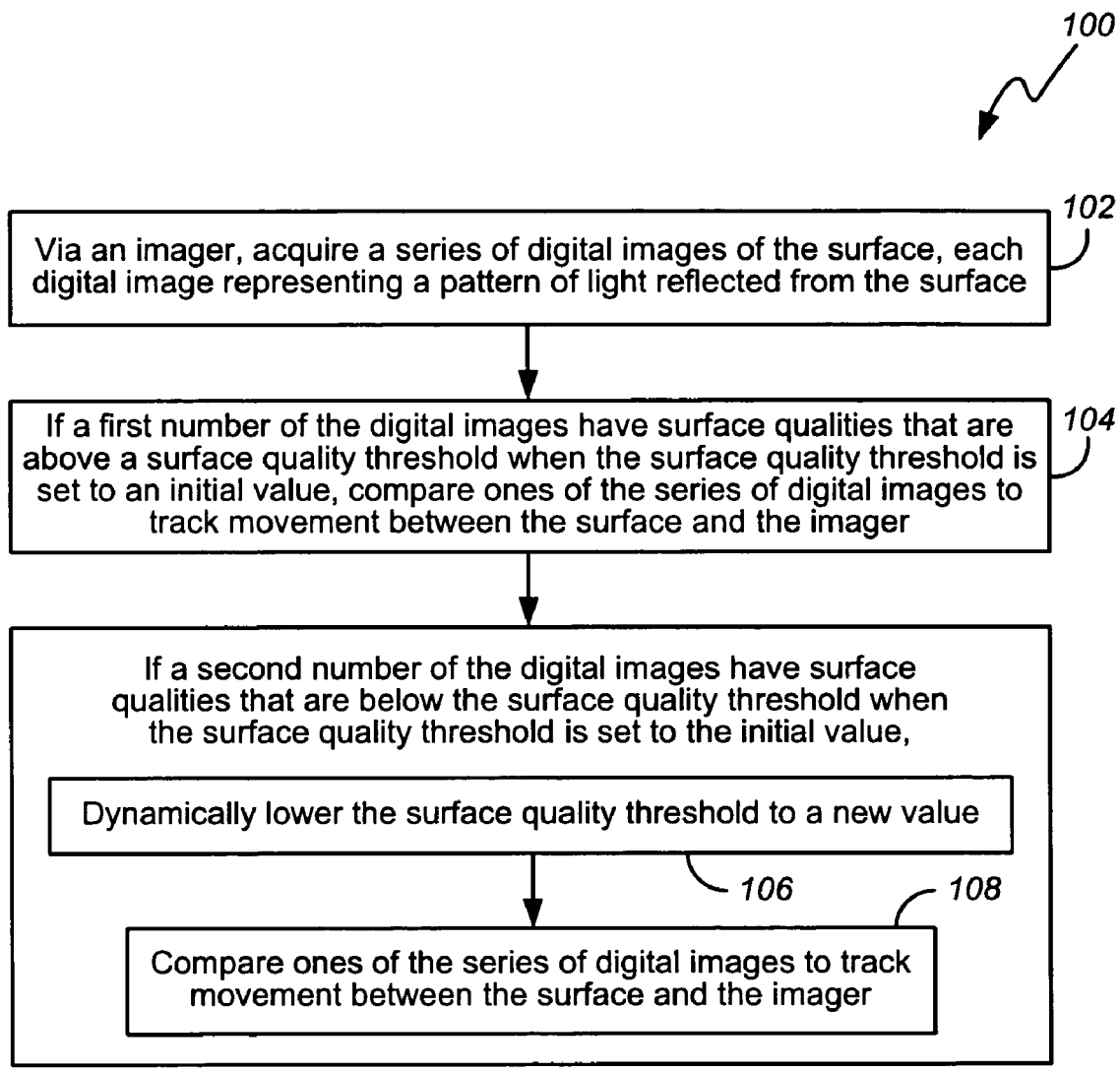
FIG. 1 illustrates an exemplary method for tracking movement between a surface and an imager.

In light of the above problems, FIG. 1 illustrates an exemplary method 100 for tracking movement between a surface and an imager. The method 100 comprises, acquiring 102 via the imager a series of digital images of the surface. Each of the digital images represents a pattern of light that is reflected from the surface. If a number of the digital images have surface qualities that are above a surface quality threshold when the surface quality threshold is set to an initial value, ones of the series of digital images are compared 104 to track movement between the surface and the imager. On the other hand, if a number of the digital images have surface qualities that are below the surface quality threshold when the surface quality threshold is set to the initial value then, i) the surface quality threshold is dynamically lowered 106 to a new value, and thereafter ii) ones of the series of digital images are compared 108 to track movement between the surface and the imager.

Figure 2:
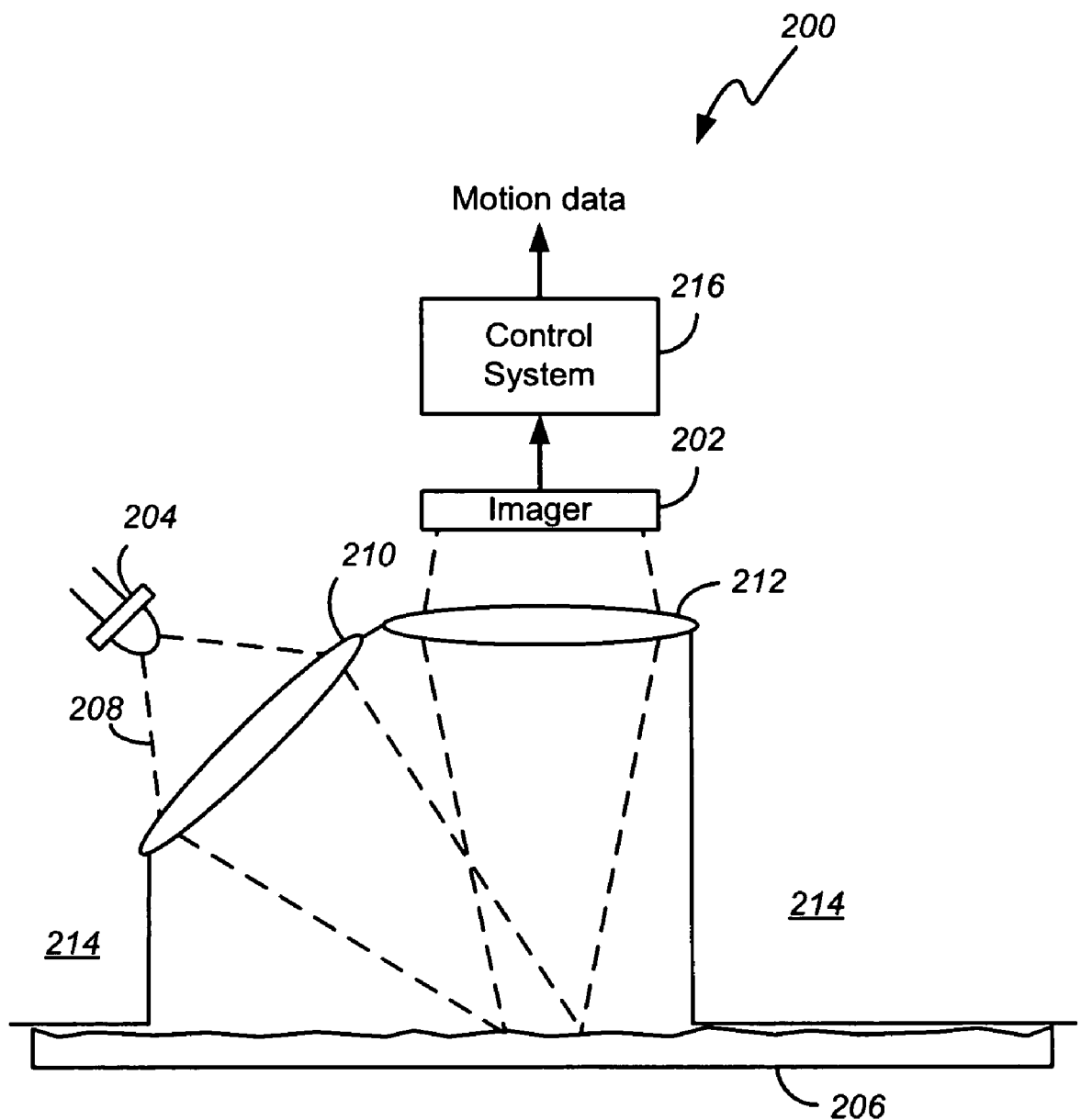
FIG. 2 illustrates an exemplary device for tracking movement.

FIG. 2 illustrates an exemplary device 200 in which the method 100 may be implemented. The device 200 comprises an imager 202 and a light source 204, both of which are positioned above a surface 206. The light source 204 and imager 202 are positioned with respect to one another such that, under ideal conditions, the light 208 projected by the light source 204 is reflected off the surface 206 and onto the imager 202. Depending on the respective sizes and positions of the light source 204 and imager 202, as well as the projection angle of the light 208 exiting the light source 204, various focusing optics 210, 212 may be positioned 1) between the light source 204 and the surface 206, and 2) between the surface 206 and the imager 202.

Typically, the imager 202 will comprise a two-dimensional array of pixels. However, in some limited cases, the imager 202 could comprise a one-dimensional array of pixels (i.e., for detecting motion in a single, controlled direction).

By way of example, the light source 204 may take the form of an LED or laser diode. Preferably, the light source 204 emits only a single wavelength of light (or some small band of light wavelengths). The imager 202 can then be configured to sense the light 208 that is emitted by the light source 202 and ignore all other wavelengths of light, such as stray ambient light.

As shown, the components 202, 204, 210, 212 of the device 200 may be mounted to a housing 214. In one embodiment, the housing 214 is a computer mouse housing.

The device 200 may further comprise a control system 216 to, in conjunction with the imager 202, implement the method 100 (FIG. 1). The control system 216 may take various forms, and may be implemented in any one or combination of: hardware, firmware or software. In the latter two cases, the firmware or software may be used to program a microcontroller of the control system 216.

In some cases, the imager 202 and control system 216 may be integrated in a single integrated circuit (IC). Alternately, the control system 216 may be distributed between the device 200 and a computer or other machine to which the device 200 is connected. In still other cases, the control system 216 may be entirely implemented by a computer or other machine to which the device 200 is connected.

When the control system 216 is implemented partly or wholly outside of the device 200, the device 200 may, for example, send either raw image data (e.g., a read out of all of the values of the imager's pixels) or motion data (e.g., Delta X and Delta Y data) to the computer or other machine that implements part or all of the control system 216.

The device 200 may further comprise an interface (not shown) for sending motion data to (or receiving program information from) a computer or other machine. In some embodiments, the interface may take the form of a Universal Serial Bus (USB) or PS/2 interface.

Figure 3:
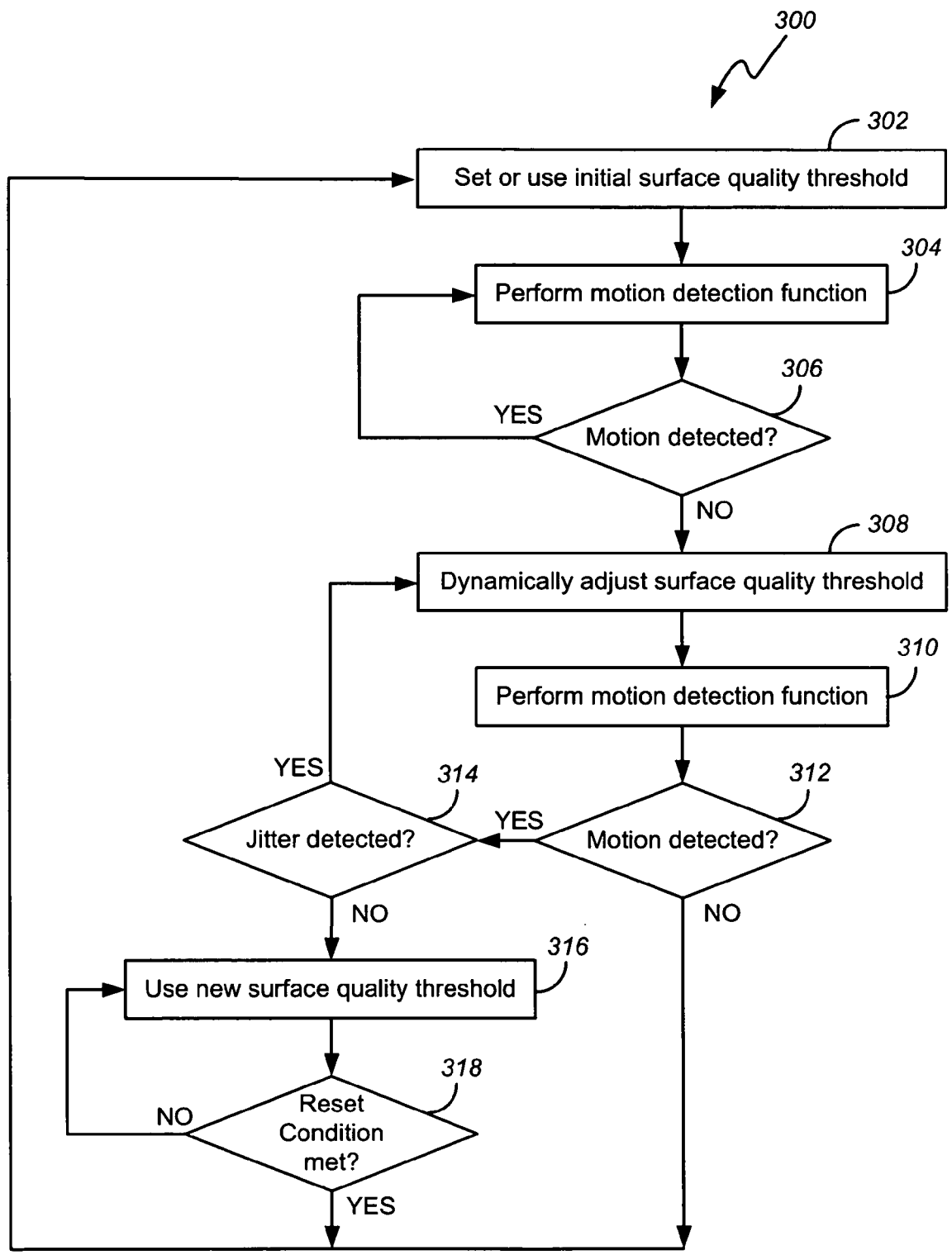
FIG. 3 illustrates an exemplary decision tree showing how the FIG. 1 method might be implemented by the FIG. 2 device.

FIG. 3 illustrates an exemplary decision tree 300 showing how the method 100 (FIG. 1) might be implemented by the device 200 (FIG. 2). To begin, a surface quality threshold having an initial value is set or used at block 302. A motion detection function is then performed at block 304, and the control system 216 determines at block 306 whether motion is detectable. If motion is detected, the device 200 continues to detect motion using the initial surface quality threshold.

If motion cannot be detected at block 306, the surface quality threshold is dynamically adjusted (i.e., lowered) to a new value at block 308. In some embodiments, the surface quality threshold may be lowered as soon as a single image of the imager 202 has a surface quality that is below the surface quality threshold. In other embodiments, the surface quality threshold may not be lowered until a plurality of the imager's images have surface qualities that are below the surface quality threshold. In some cases, the number of images that need to have low surface qualities may be programmable.

Lowering of the surface quality threshold at block 308 may be undertaken in a variety of ways. In one embodiment, the surface quality threshold is merely set to a new value that is less than or equal to the surface qualities of the second number of digital images (which, as mentioned above, may sometimes include only a single digital image). In another embodiment, the surface quality threshold may be set to a new value by iteratively i) lowering the surface quality threshold to a new value, ii) comparing ones of a series of digital images to track movement between the surface 206 and the imager 202 (i.e., performing a motion detection function), iii) determining whether there is movement, and iv) if there is no movement, dynamically lowering the surface quality threshold to another new value.

After the surface quality threshold has been lowered to a new value at block 308, a motion detection function is performed at block 310 using the new surface quality threshold. The control system 216 then determines at block 312 whether motion is detectable; and, if motion is not detected, the surface quality threshold is reset to its initial value at block 302. The method 300 is then repeated. However, if the new surface quality threshold enables motion to be detected, it is then determined at block 314 whether the detected motion is merely a result of jitter. If yes, the surface quality threshold is adjusted (i.e., raised) at block 308; a motion detection function is performed at block 310; and the control system 216 once again determines whether motion or jitter is detectable at blocks 312 and 314. Alternately, the detection of jitter may simply result in a reset of the surface quality threshold to its initial value.

If no jitter is detectable at block 314, the new surface quality threshold is then put into use at block 316, and is used until such time that a reset condition is met at block 318. Upon occurrence of the reset condition, the surface quality threshold is reset to its initial value. The reset condition may take various forms, and may include one or more of the forms disclosed in the following paragraphs.

In one embodiment, the reset condition may be a failure to detect any additional movement. In some cases, the failure to detect movement may be the result of failing to detect movement between two successively acquired images of the surface 206. In other cases, the failure to detect movement may be the result of failing to detect movement over a plurality of images, or for a fixed period of time.

In another embodiment, the reset condition may be the passage of a given amount of time since the surface quality threshold was adjusted to its new value. Thus, regardless of whether motion is still being detected, the surface quality threshold may be reset to its initial value after the given amount of time has elapsed. In some cases, the "given amount of time" may be programmable.

In yet another embodiment, the reset condition may be a determination that a given number of images have achieved surface qualities that exceed the current (or initial) surface quality threshold. The number of images that exceed the surface quality threshold may be one image, a plurality of images in succession, or a plurality of images over a given period of time. In some cases, the number of images that must exceed the surface quality threshold may be programmable.

What is claimed is:

1. A method of tracking movement between a surface and an imager, comprising:
    via the imager, acquiring a series of digital images of the surface, each digital image representing a pattern of light reflected from the surface;
    if a first number of the digital images have surface qualities that are above a surface quality threshold when the surface quality threshold is set to an initial value, comparing ones of the series of digital images to track movement between the surface and the imager; and
    if a second number of the digital images have surface qualities that are below the surface quality threshold when the surface quality threshold is set to the initial value, then i) dynamically lowering the surface quality threshold to a new value, and thereafter ii) comparing ones of the series of digital images to track movement between the surface and the imager.

2. The method of claim 1, wherein the new value is less than or equal to the surface qualities of the second number of digital images.

3. The method of claim 1, further comprising, iteratively i) lowering the surface quality threshold to the new value, ii) comparing ones of the series of digital images to track movement between the surface and the imager, iii) determining whether there is movement, and iv) if there is no movement, dynamically lowering the surface quality threshold to another new value.

4. The method of claim 1, further comprising, once the surface quality threshold has been dynamically lowered to the new value, and after comparing ones of the series of digital images to track movement between the surface and the imager, i) determining whether there is movement, and ii) if there is no movement, resetting the surface quality threshold to the initial value.

5. The method of claim 1, further comprising, once the surface quality threshold has been dynamically lowered to the new value, i) maintaining the new value until a given amount of time has passed since dynamically lowering the new value; and then ii) resetting the surface quality threshold to the initial value.

6. The method of claim 5, wherein the given amount of time is programmable.

7. The method of claim 1, further comprising, once the surface quality threshold has been dynamically lowered to the new value, i) maintaining the new value until a third number of the digital images are determined to have surface qualities above the surface quality threshold, and then ii) resetting the surface quality threshold to the initial value.

8. The method of claim 7, wherein the third number of the digital images is programmable.

9. The method of claim 1, further comprising, illuminating the surface.

10. The method of claim 1, further comprising, after lowering the surface quality threshold to the new value, assessing jitter in tracked movement, and if jitter exists, resetting the surface quality threshold to the initial value.

11. The method of claim 1, further comprising, after lowering the surface quality threshold to the new value, assessing jitter in tracked movement, and if jitter exists, adjusting the surface quality threshold to a higher value.

12. The method of claim 1, wherein the second number of the digital images is a plurality of the digital images.

13. The method of claim 1, wherein the second number of the digital images is one of the digital images.

14. A device for tracking movement, comprising:
    an imager to acquire a series of digital images of a surface, each digital image representing a pattern of light reflected from the surface; and
    a control system to,
        if a first number of the digital images have surface qualities that are above a surface quality threshold when the surface quality threshold is set to an initial value, compare ones of the series of digital images to track movement between the surface and the imager; and
        if a second number of the digital images have surface qualities that are below the surface quality threshold when the surface quality threshold is set to the initial value, then i) dynamically lower the surface quality threshold to a new value, and thereafter ii) compare ones of the series of digital images to track movement between the surface and the imager.

15. The device of claim 14, wherein the new value is less than or equal to the surface qualities of the second number of digital images.

16. The device of claim 14, wherein the control system iteratively i) lowers the surface quality threshold to the new value, ii) compares ones of the series of digital images to track movement between the surface and the imager, iii) determines whether there is movement, and iv) if there is no movement, dynamically lowers the surface quality threshold to another new value.

17. The device of claim 14, further comprising, once the surface quality threshold has been dynamically lowered to the new value, and after comparing ones of the series of digital images to track movement between the surface and the imager, i) determine whether there is movement, and ii) if there is no movement, reset the surface quality threshold to the initial value.

18. The device of claim 14, wherein the imager and the control system are integrated in a single integrated circuit.

19. The device of claim 18, wherein the single integrated circuit comprises a Universal Serial Bus (USB) interface.

20. The device of claim 18, wherein the single integrated circuit comprises a PS/2 interface.

21. The device of claim 14, wherein the control system comprises a microcontroller under control of firmware.

22. The device of claim 14, wherein the control system comprises a microcontroller under control of software.

23. The device of claim 14, further comprising a light source to illuminate the surface.

24. The device of claim 23, further comprising a computer mouse housing in which the light source, the imager and the control system are mounted.

* * * * *